United States Patent

Moulin

[15] 3,704,357
[45] Nov. 28, 1972

[54] INDUCTOR ARRANGEMENT FOR INDUCTION HEATING APPLICATION PARTICULARLY FOR BRAZING PRESSES

[72] Inventor: Jean Moulin, Massy, France

[73] Assignee: Societe De Traitements Electrolytiques Et Electrothermiques (Stel)

[22] Filed: Dec. 29, 1971

[21] Appl. No.: 213,295

[30] Foreign Application Priority Data

Jan. 8, 1971 France............7100521

[52] U.S. Cl. ..........219/10.79, 219/10.43, 219/10.75
[51] Int. Cl. ...........................................H05b 9/02
[58] Field of Search......219/10.79, 10.43, 10.75, 9.5, 219/10.49, 10.53

[56] References Cited

FOREIGN PATENTS OR APPLICATIONS 1,048,082 11/1966 Great Britain..........219/10.79
1,064,903 4/1967 Great Britain..........219/10.49

Primary Examiner—J. V. Truhe
Assistant Examiner—Bruce A. Reynolds
Attorney—John W. Malley et al.

[57] ABSTRACT

An inductor arrangement for induction heating of one or more flat circular plates of different diameters including a first set of windings always active during operation of the brazing press and a second set of windings selectively inserted in series with the first set. The first set comprises a central portion including on or more small diameter pancake coils covering the center of the plate to be heated and a peripheral portion made up of a flat annular spiral surrounding the central portion and further away from this plate than the latter. The second set comprises a flat annular spiral each of whose turns is tapped so as to insert that one or pair of turns which faces the peripheral zone of the plate to be heated in series with the first set.

8 Claims, 4 Drawing Figures

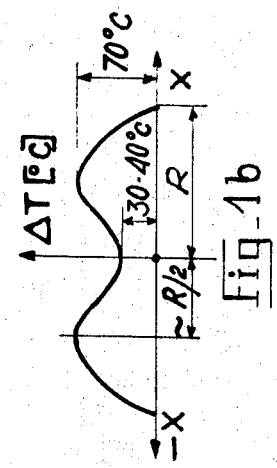
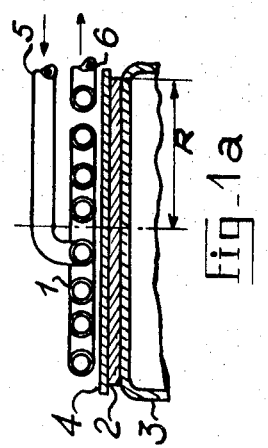
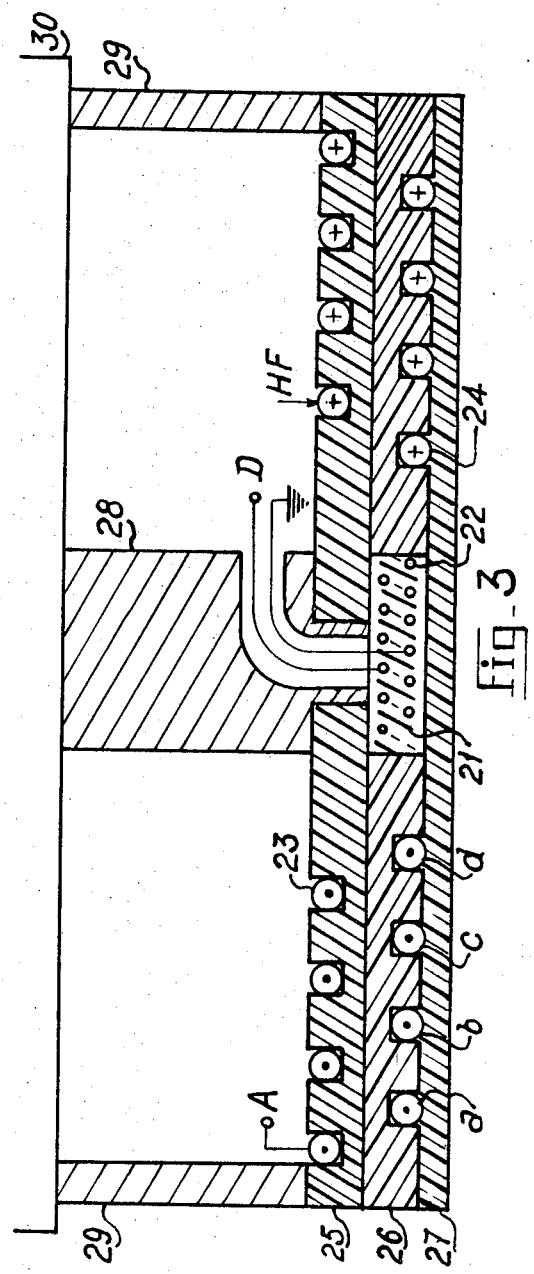

Inventor
JEAN MOULIN

INDUCTOR ARRANGEMENT FOR INDUCTION HEATING APPLICATION PARTICULARLY FOR BRAZING PRESSES

The present invention relates to improvements in the inductor arrangements utilized for induction heating applications. It relates more particularly to inductor arrangements of this kind which are employed in brazing presses in order to braze together two or more parallel metal plates to form a laminated metal structure.

Brazing presses of this kind are utilized for example in the manufacture of cooking utensils, in particular casseroles, the bases of which are constituted by a laminated metal structure comprising at least two brazed plates whereof one at least is made of a metal having good thermal conductivity, such as copper or aluminum.

It is well known that when heating surfaces which are to be brazed, one of the major and most delicate problems to be overcome is that of the temperature distribution.

In other words, in order to obtain a good quality brazed joint at all points in the pieces of material being brazed together, it is necessary for the temperature distribution at the interface between the components to be as uniform as possible.

In order to achieve a high degree of uniformity in temperature, various solutions have already been proposed, dealing in particular with the shape of the inductor used to heat the components such as those having flat (or pancake), conical or frusto-conical spiral windings.

A particularly significant embodiment of an inductor of this kind is described in United States Pat. application Ser. No. 54,251 and now Pat. No. 3,632,948, filed July 13, 1970. In this embodiment, the inductor is wound spiral fashion so that the distance between turns in the plane of brazing is variable and is a function of the distance between each of said turns and the center of the components being brazed, and the distance between said turns and their periphery, in order thus to compensate for the temperature differences observed in the case of a flat spiral inductor.

Inductors of this kind give excellent results when brazing together the plates which are used for example to manufacture the bottoms of casseroles. However, they present a serious drawback.

In other words, it is obvious that the maximum diameter of the spiral which constitutes the inductor is a function of the diameter of the components being brazed together and also of the distance between the different turns and the brazing plane. Thus, the inductor should differ in accordance with the diameter of the casseroles being brazed and this complicates their design and increases their cost.

There also has been proposed in British Pat. specification No. 1,064,903 filed Feb. 17, 1965 an induction heating arrangement comprising a flat, i.e., pancake inductor of large diameter and a set of flat ring-shaped conductors (providing a short-circuit) having different inner diameters, arranged around the plate to be brazed coaxially therewith and adjacent to the windings of the pancake inductor, where it exceeds the area of the plate. Such an arrangement enables plates of different diameters to be heated and/or brazed together by means of the same pancake inductor, if the inner diameter of the short-circuit ring is adapted to (i.e. slightly greater than) the diameter of the plates.

Such an arrangement however incurs considerable power loss in the ring-shaped short-circuit which has to be water-cooled and the temperature distribution obtained thereby, particularly when using high frequency power, is far from uniform.

The object of the present invention is to produce an improved inductor arrangement which enables components which are being brazed together to be heated uniformly and which can be utilized for components of different diameters without incurring important power losses.

In accordance with the invention, there is provided an inductor arrangement for induction heating, particularly for the brazing of one or more flat circular plates of different diameters comprising:

a first set of windings, whereof all are permanently inserted within the path a high-frequency current during heating operation, including:

A center portion made up from one or more parallel superposed small diameter flat spiral coils parallel to and located close to said plates for heating substantially the central zone thereof, and A peripheral portion made up from a first annular large diameter flat spiral coil having an inner diameter greater than the outer one of said center portion coil and an outer diameter corresponding substantially to that of the largest plate to be heated, said peripheral coil being parallel to and located further away from said plates than said central portion, said central and peripheral portion coils being series connected; and a second set of windings made up from a second large diameter flat spiral coil including a plurality of turns and surrounding said center portion, said second coil having an inner diameter greater than the outer one of said center portion and an an outer diameter corresponding substantially to that of the largest plate to be heated and being located between said first annular coil and said plates, each of said turns of said second coil having a tap for respectively selectively inserting one or more of said turns, located in the vicinity of the edges of said plates, in series with said first set through connecting means, whereby the high-frequency current flowing through the totality of turns of said second set and through the active ones of said first set is such that the magnetic fields engendered thereby are parallel and of the same direction.

Other objects and features of the invention will become apparent from the following description, which is given purely by way of example, and is illustrated by the accompanying drawings, wherein:

FIG. 1a is a schematic sectional view of a prior art inductor of the "pancake" type utilized for example to braze a plate to the base of a casserole.

FIG. 1b shows the form of the temperature distribution curve at the interface between the brazed components of FIG. 1a.

FIG. 3 is a schematic sectional view of an embodiment of an inductor arrangement in accordance with the invention.

Figure 2:
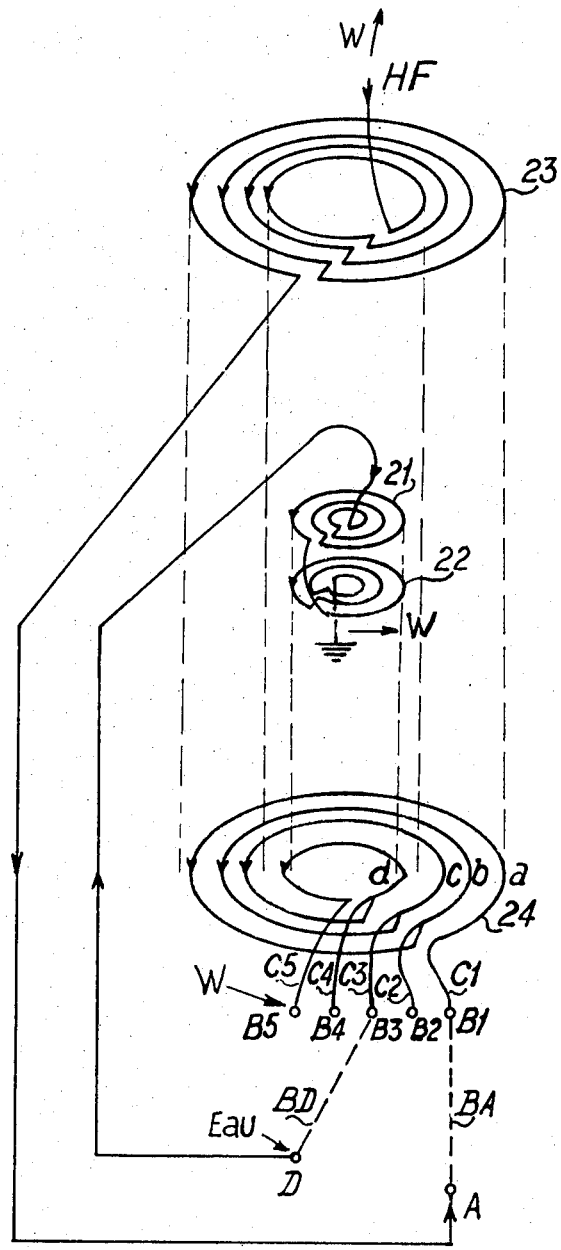
FIG. 2 is an exploded diagram for an improved inductor arrangement in accordance with the present invention.

In FIG. 1a, there schematically illustrated in section a single pancake i.e. a flat spiral inductor 1 designed to heat a plate 2 (copper or aluminum for example) and the base of an utensil 3 to which said plate 2 is to be brazed. This inductor 1 is fed at its extremities 5 and 6 a high-frequency current and water (symbolized by an arrow) is circulating through its windings. A plate 4, known as a "susceptor", made of ferromagnetic material, is generally arranged between the inductor and the components being brazed in order to help to improve the uniformity of the temperature distribution and/or eventually to limit the brazing temperature to the Curie point of the material of which it is made.

FIG. 1b illustrates the shape of the curve plotting the distribution of temperature at the interface between the components 2 and 3, for an inductor of the kind shown in FIG. 1a and for circular components. The abscissae plot the distance X from the center of the plate 2 and the ordinates the temperature difference ΔT in relation to the temperature at the edge of the plate 2. This graph exhibits a temperature minimum at the center of the plates 2, 3 and 4 and two maxima at either side of the center, this at a distance approximately equal to half the radius R of the plates.

The minimum temperature at the edges of the plate is due chiefly to radiation from the cylindrical sidewalls of the utensil 3.

The various aforementioned solutions, which have been proposed to achieve a uniform temperature distribution at the interface, either do not allow the same inductor to be used to heat plates of different diameters or incur excessive power losses. It is to be noted that in order to obtain a good quality brazed joint, not only must the total effective diameter of the inductor be approximately equal to that of the plate being brazed, but also the induced current intensity should be higher at the center and the edge of the plate and lower at a circumference which is approximately equidistant from said center and said periphery and therefore varies with the diameter.

To achieve this kind of result, an improved inductor arrangement in accordance with the invention comprises a first set of continuously active windings, i.e., ones wherethrough the high-frequency current is flowing whatever the diameter of the plates being brazed, and a second set of turns one or more whereof are selectively connected to the first set by means of a set of connecting bars depending on the dimensions of the plates being brazed, the diameter in the case of circular plates. It is thus possible to obtain optimum temperature distribution for different diameters, not simply by adding or removing turns at the periphery of the inductor, but by displacing the zone of lowest induced current intensity which should be located halfway between the center and the periphery of the plates being brazed (i.e. the zone showing a temperature maximum in FIG. 1b).

FIG. 2 schematically illustrates an exploded view of an improved inductor arrangement in accordance with the invention, which can be adapted to heat or braze circular plates having different diameters.

FIG. 3 illustrates in section a particular practical embodiment of this kind of inductor arrangement, showing the relative positions of the different windings of FIG. 2.

The first set of windings of the inductor arrangement, which is always fed by the high-frequency current whatever the dimensions of the plate or plates to be heated comprises : a center portion made up of one 22 or two superposed 21, 22 small diameter pancake inductors parallel to these plates, located close to the latter and facing the central zone thereof (so as to compensate for the central minimum of the temperature distribution curve of FIG. 1b), and – a peripheral portion constituted by an annular single flat spiral of the pancake type having an inner diameter greater than that of the center portion, an outer diameter corresponding at least approximately to that of the greatest diameter to be heated and located at a distance from the plates which is greater than that of the center portion.

This distance may be determined by the means described in the aforementioned copending United States Patent application, so as to ensure that the temperature at middistance between the center and the outer edges of the plates is the same as that obtained by the same intensity high-frequency current flowing through the center portion (i.e. to compensate for the two temperature maxima of the curve of FIG. 1b).

If the center portion, is made up of two superposed flat spirals 21, 22, as shown in FIGS. 2 and 3, the turns of one of the spirals are so arranged that, viewed from above or below, they fall substantially in the middle between two neighboring turns of the other spiral, so as to enable their packing together as closely as possible.

The windings of the center portion are generally made of copper tubing and wound substantially in the shape of an Archimedean spiral for ease of manufacture. They may also be made up of a set of concentric circular turns connected together by means of straight tube portions (which may be radially disposed).

The two windings 21, 22 making up the center portion of the first set of windings will be fed in series by the high-frequency current so that the current flow in the neighboring turn of both spiral windings will have the same direction. The flow of cooling fluid will also be in series, i.e., the two windings 21 and 22 are interconnected by means of a copper tube stub.

In a preferred embodiment, one of the ends of the bottom spiral 22, which is the closest to the plates to be heated, constitutes one of the terminals of the inductor arrangement and is grounded. This makes it possible to prevent any undesired arcing from the windings to the components being brazed (and to the susceptor), which are at ground potential.

The flat spiral 23 forming the peripheral portion of the first set and which is likewise always active, surrounds the central portion 21, 22 thereof, and is located, as FIG. 3 indicates, above the plane containing the spiral 22, which plane, in the following description, shall be called "reference" plane whose distance from the plate to be heated is determined in a way mentioned above.

One of the ends of said spiral 23, which forms the second winding of the inductor arrangement, is connected to a high-frequency power source (not shown).

The second set of windings of the inductor arrangement comprises a flat spiral 24 which, like the spiral 23, surrounds the central portion 21, 22 of the inductor, but is located closer to the plates to be brazed (between spiral 23 and the latter) i.e., approximately in the same plane as the central portion 21, 22. This spiral 24, as well as spiral 23, are designed in the form of concentric circular turns interconnected by straight stub portions. The spiral 24, covering the outer zone of the maximum diameter plates to be heated, comprises a plurality of turns each of which is tapped so that any one or more thereof can be connected into the circuit through which the high-frequency current flows. The turns inserted into the circuit carrying the high-frequency current are chosen so as to face the peripheral zone of the plates to be heated, i.e., to enhance the heating effect at their edges to compensate for the heat loss by conduction and radiation through the cylindrical sleeves of work blank 3 as can be seen from the outer minima of the curve $\Delta T(x)$ of FIG. 1b. That is to say that the active turns of spiral 24 are chosen in dependence of the diameter of the plates to be brazed and face a zone close to the edges (R) thereof and the dead turns faces the zone lying around mid-distance between the center and these edges (R/2).

It goes without saying that this overall arrangement of spiral windings is fed electrically in such a manner that the magnetic fields they produce and the thermal effects which result therefrom, are all of the same sign and therefore additive.

As a matter of fact, to the end of each of the turns of the spiral 24, there being four in the example considered here marked $a, b, c, d$, there is connected a conductor element $C_1, C_2, C_3, C_4, C_5$, which in turn are connected to respective terminals $B_1, B_2, B_3, B_4, B_5$. Each of the two ends of the turn $a$, is accessible for example respectively through the terminals $B_1$ and $B_2$, those of the turn $b$, through the terminals $B_2$ and $B_3$.

A set of conducting bars BA, BD makes it possible, as required, to connect these turns into the electrical circuit of the inductor arrangement, or otherwise.

In a particularly simple embodiment, that shown in FIG. 2, the connecting or disconnecting of certain of the turns is effected by means of two conductor bars BA, BD, one being connected between a terminal A representing the HF current output of the winding 23, and one or the other of the terminals $B_1$ to $B_4$, and the other between an HF input terminal D of the central portion 21, 22, and one or the other of the terminals $B_2$ to $B_5$.

As mentioned before in the embodiment of FIG. 2, the assembly of spirals of the inductor arrangement is supplied elctrically in series.

As far as the cooling fluid circulation is concerned, this can be effected in a variety of ways, although of course all the active turns must be supplied. In one example, water inputs W can be arranged at the terminals D and B5, outputs W being provided at the two terminals proper of the inductor (HF and ground). In this case, the conductor elements $C_1$ to $C_5$ and the two bars BA and BD are made, in the same way as the spirals 21 to 24, of hollow conducting tubes (for example copper tube). Those of the terminals $B_1$ to $B_5$ which are free, are then closed off by plugs ; in this case, the water does not circulate through the inactive turns. In a more sophisticated embodiment, an auxiliary water supply to the inactive turns is provided.

An advantage of the cooling circuit shown in FIG. 2 is that the central portion of the first set 21, 22 is supplied independently of the two other spirals 23 and 24, making it possible to increase the water flow in this central portion which is the most difficult to cool.

The inductor arrangement which has been described makes it possible to adjust the heat distribution curve produced thereby to the dimensions of the plates to be heated so that it is substantially uniform. In the example illustrated in FIG. 2, the turns $a$ and $b$ are active, the turns $c$ and $d$ inactive. The maximum intensity of current induced in the plates occur at the center of the inductor beneath the center portion 21, 22 and at the edges, beneath turns $a$ and $b$ which cover the peripheral zone thereof whilst the minimum current intensity is beneath the turns $c$ and $d$, i.e., about mid-distance between the center and the edges of the plates.

It should be noted that the spirals 23 and 24 do not necessarily have the same number of turns or dimensions and that they are mutually offset in order to achieve more uniform temperature distribution.

FIG. 3 schematically illustrates a practical embodiment of an inductor arrangement of this kind, the materials which support and/or surround the different spirals being chosen as a function of their mechanical strength, heat resistance and their electrically insulating qualities. They must provide suitable resistance to the forces exerted by the press ; they should provide good electrical insulation at high frequencies.

In one example, the double central spiral 21, 22 is embedded in a plastic material or a thermoplastic resinous material and the spirals 23 and 24 are recessed into appropriately profiled plates made of a resinous glass fiber 25, 26, 27.

Only some of the leads have been shown in this figure. The pressure is applied to the components being brazed mainly through a hollow cylindrical sidewall 29 and eventually a central cylindrical column 28 which effectively transmits the forces developed by the press (not shown) through its extremity 30, to the components being brazed. These components 28 and 29 are made of a rigid insulating material such as wood, bakelited cardboard or ceramic.

In another embodiment, the assembly of spirals is embedded in a rigid, insulating thermoplastic material or in an asbestos-cement mold which is refractory.

An inductor of the type described makes it possible readily to produce a good quality brazed attachment of plates whose diameters range for example between at least simple and double.

What is claimed, is :

1. Inductor arrangement for induction heating particularly for the brazing of one or more flat circular plates of different diameters comprising :
    a first set of windings, whereof all are permanently inserted within the path of a high-frequency current during heating operation, including :
    a center portion made up from one or more parallel superposed small diameter flat spiral coils parallel to and located close to said plates for heating substantially the central zone thereof, and
    a peripheral portion made up from a first annular large diameter flat spiral coil having an inner diameter greater than the outer one of said center portion coil and an outer diameter corresponding substantially to that of the largest plate to be heated, said peripheral coil being parallel to and located further away from said plates than said central portion, said central and peripheral portion coils being series connected:

a second set of windings made up from a second annular large diameter flat spiral coil including a plurality of turns and surrounding said center portion, said second coil having an inner diameter greater than the outer one of said center portion and an outer diameter corresponding substantially to that of the largest plate to be heated and being located between said first annular coil and said plates, each of said turns of said second coil having a tap for respectively selectively inserting one or more of said turns, located in the vicinity of the edges of said plates, in series with said first set through connecting means, whereby the high-frequency current flowing through the totality of turns of said first sets and through the active ones of said second set is such that the magnetic fields engendered thereby are parallel and of the same direction.

2. Arrangement as claimed in claim 1, wherein the center portion comprises two superposed parallel flat spirals of the pancake type having substantially the same number of turns and disposed as close to each other as possible, said two spirals being series connected and one extremity of the spiral which is closest to said plates being grounded.

3. Arrangement as claimed in claim 1, wherein said first and second sets of windings are made up from hollow tubes of a conducting metal and cooled by a fluid flowing through one or more cooling circuits comprising said tubes, and wherein the electrical and hydraulic interconnection of said coils is carried out by means of stubs made of tubes of the same kind.

4. Arrangement as claimed in claim 3, wherein said connecting means are made of hollow conducting metal tubes and constitute an integral part of said cooling circuit.

5. Arrangement as claimed in claim 3, wherein said center portion spiral coils make up a separate first cooling circuit independent from the one cooling said first and second annular coils.

6. Arrangement as claimed in claim 1, wherein said first and said second annular coils are each made up from a plurality of concentric circular turns of metal tubing each being connected to the adjacent one through a tubular stub portion ensuring simultaneously an electric and a hydraulic connection.

7. Arrangement as claimed in claim 1, wherein different spirals are recessed into blocks of rigid electrically insulating material such as resinous glass fiber.

8. Arrangement as claimed in claim 1 wherein it is embedded in a hardenable electrically insulating plastic material.

* * * * *